_United States Patent Office_ 3,235,502
Patented Feb. 15, 1966

3,235,502
FOAM-INHIBITED OIL COMPOSITIONS
Hans F. Waldmann, Glassboro, N.J., assignor to Socony
Mobil Oil Company, Inc., a corporation of New York
No Drawing. Filed June 11, 1962, Ser. No. 201,311
5 Claims. (Cl. 252—49.6)

This invention relates to the inhibition of foam in oil compositions containing materials which normally tend to promote foaming of the composition. More particularly, the invention relates to such oil compositions to which have been added silicone polymers and special inhibitors.

In the preparation of oil compositions for use as hydraulic fluids, as lubricants and the like, various additives are used to prevent sludging, deposition of gum and resinous materials, or similar objectionable results. These additives are generally in the nature of detergents which are effective for the intended purposes but, characteristically, increase the foaming tendencies of the oil composition. To overcome this problem, silicone polymers have been employed in the prior art with some degree of success. Unfortunately, however, the silicones which do initially suppress foaming, lose their effectiveness in a relatively short period of time. Many materials have been suggested for prolonging the foam-inhibiting action of the silicones with generally indifferent success.

According to the present invention, it has now been found that oil compositions containing detergent additives which promote foaming and silicone polymer antifoamants may be kept substantially foam-free by incorporating into the compositions, a small amount of an alkoxylated aliphatic acid having the formula:

$$RCOO(R'O)_xH$$

wherein R represents an aliphatic radical containing from about 4 to about 24 carbon atoms, R'O represents a member of the group consisting of ethylene oxide $$(-CH_2CH_2O-)$$

and propylene oxide

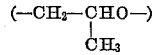

radicals and $x$ represents an integer from 1 to 25, inclusive. R may be a straight-chained, branch-chained or a cycloaliphatic radical and may be saturated or unsaturated. These alkoxylated compounds are referred to herein as inhibitors.

The inhibitors of the invention are well known and are readily prepared by reacting the acid, or mixture of acids, with either ethylene oxide or propylene oxide or mixtures thereof. The reaction is generally carried out at elevated temperatures in the presence of a basic catalyst, such as an alkali metal hydroxide, employing a mol ratio of the ethylene oxide or propylene oxide to the acid which will provide the desired number of ethylene oxide or propylene oxide units in the resulting alkoxylated product. Generally, the reaction is a random one and a single alkoxylated compound is not obtained, but a mixture of alkoxylated compounds, the product in any particular case being identified by the average number of alkoxide groups incorporated into the acid. Typical of the acids suitable for preparing the inhibitors are pentanoic, octanoic, decanoic, lauric, myristic, palmitic, stearic, oleic, ricinoleic, linoleic, linolinic, etc. Also, mixed fatty acids derived from coconut oil, cottonseed oil, castor oil, linseed oil, tung oil, fish oil, sunflower seed oil, rape oil and similar fatty acid glycerides of vegetable and animal origin may be used.

As is well known, one class of detergent additives commonly used in lubricating oil compositions are the oil-soluble metal salts of high molecular weight (300–1000) sulfonic acids, such as petroleum-derived sulfonic acids and synthetic alkyl-aryl sulfonic acids having from about 8 to about 24 carbon atoms in the alkyl portion thereof, the alkaline earth metal salts being generally preferred. Thus, normal and basic (sometimes referred to as complex or over-based) calcium and barium sulfonate salts which may or may not have been treated with carbon dioxide are widely used.

Another preferred class of detergents are the metal salts of alkylphenol sulfides, such as, for example, the normal or basic (complex) barium and calcium salts of amyl- and nonyl-substituted phenol sulfides. Such salts are fully described in the prior art. See, for example, U.S. Patents Nos. 2,451,345, 2,362,289 and 2,916,454.

Metal salts of phosphorus sulfide-hydrocarbon reaction products, particularly the alkaline earth metal salts, are also well known oil detergents, especially the barium salts. Specific salts of this character are the metal salts of phosphosulfurized polyolefins, such as the barium salts of $P_2S_5$-polypropylene reaction products. Salts of this type are fully described, for example, in U.S. Patents Nos. 2,316,080, 2,316,082, 2,316,088 and 2,806,022.

While the foregoing classes of detergent additives have been mentioned as illustrative, it will be appreciated that the principle of the present invention may be successfully applied to any oil composition containing one or more detergents which increase the foaming tendencies thereof. Also, oil compositions containing additional additives along with the foam-inducing additives, such as conventional antioxidants, pour point depressants, extreme pressure agents and the like may be improved (with respect to their foaming tendencies) by the invention.

The silicone polymers are compounds well known in the art. The dimethyl silicones which are the ones most commonly employed vary widely in molecular weight depending on the length of the polymer chain and are generally characterized by their viscosities as determined at 25° C. These silicones have the general formula:

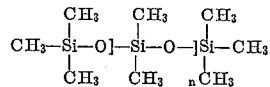

where $n$ is a number having an average value such that the silicone polymer has a viscosity at 25° C. of from about 3.0 to about 1,000,000 cs. and preferably from about 300 to about 100,000 cs. Similar polymers having longer alkyl groups and/or aryl groups are also suitable for the invention.

A full understanding of the invention will be had from the following examples in which all of the percentages given are by weight.

EXAMPLES

A series of foaming tests was conducted using an oil composition composed of 95.35% of an SAE–50 grade lubricating oil and 4.65% of typical commercial detergent additives as follows: (1) 2% of an oil concentrate (10% Ba) of a complex carbonated barium nonylphenol sulfide; (2) 0.9% of an oil concentrate (9.5% Ba) of a mixture of sulfurized barium alkylphenate and phosphosulfurized polybutene barium salt; (3) 1.0% of an oil concentrate (10% Ba) of a basic barium wax-benzene sulfonate; and (4) 0.75% of an oil concentrate (8% Zn) of zinc dihexyl dithiophosphate. This oil composition (Oil A) was blended with a typical dimethyl silicone polymer alone and with the same silicone polymer and various inhibitors typical of the invention. These compositions were then tested for foam tendency (cc. of foam after 5 minutes aeration) and foam stability (cc. of foam after 10 minutes standing), according to Sequence 1 of ASTM foam test, D-892-46T. The tests were carried out one day after preparation of the various blends (i.e., Oil A plus either silicone or silicone and inhibitor) and were repeated after 14 days and after 75 days. The results of the tests are summarized in Table I in which "EO" with its preceding number represents the average number of ethylene oxide units in the chain of the ethoxylated compound used as the inhibitor and wherein "FT" stands for foaming tendency and "FS" stands for foam stability.

*Table I*

| Inhibitor | Percent Inhibitor Added | Silicone Polymer [1] (p.p.m.) | FT/FS (cm.³) | | |
|---|---|---|---|---|---|
| | | | After 1 Day | After 14 Days | After 75 Days |
| Oil A | None | 2 | 660/610 | 670/610 | |
| Coconut Oil Fatty Acids [2] plus 5 EO | 0.3 | 2 | 5/0 | 130/10 | 250/20 |
| Stearic Acid plus 5 EO | 0.3 | 2 | 0/0 | 15/0 | 100/5 |
| Stearic Acid plus 8 EO | 0.3 | 2 | 5/0 | 5/0 | 60/0 |
| Stearic Acid plus 10 EO | 0.3 | 2 | 0/0 | 25/0 | 170/0 |
| Stearic Acid plus 15 EO | 0.3 | 2 | 10/0 | 150/0 | 90/0 |
| Oleic Acid plus 5 EO | 0.3 | 2 | 0/0 | 0/0 | 140/0 |
| Oleic Acid plus 10 EO | 0.3 | 2 | 50/0 | 220/20 | 240/5 |
| Oleic Acid plus 5 EO | 0.1 | 2 | 0/0 | 0/0 | 25/0 |
| Oleic Acid plus 5 EO | 0.05 | 4 | 0/0 | 5/0 | 5/0 |
| Mixture of 70% Rosin [3] +30% C₁₆-C₁₈ Unsaturated Fatty Acids plus 15 EO | 0.05 | 4 | 5/0 | 5/0 | 15/0 |
| | 0.03 | 6 | 5/0 | 0/0 | 0/0 |

[1] Dow-Corning Fluid 200, 60,000 cs. at 25° C.
[2] A mixture of C₈-C₁₈ (principally C₁₂-C₁₄) aliphatic acids.
[3] Approximately 90% abietic acid.

A second series of foaming tests was conducted after the fashion of the preceding series employing an oil composition prepared with the 50-SAE grade base oil used in Oil A and containing three of the additives used in Oil A in the following amounts based on the total composition: 1.5% addittive (1), 1.5% additive (3) and 0.5% additive (4). In these tests the 50-SAE grade base oil without additives, the compounded oil (Oil B) and the compounded oil having added thereto varying amounts of the same silicone polymer used in the first test series were tested with the results shown in Table II. The tests were conducted one day after the blends (Oil B plus the silicone) were prepared.

*Table II*

| | Silicone Added p.p.m. | Foam FT/FS (cm. 3) |
|---|---|---|
| Base Oil (No Additives) | None | 400/10 |
| Base Oil (No Additives) | 1.5 | 0/0 |
| Oil B | None | 670/630 |
| Oil B | 1.5 | 600/500 |
| Oil B | 3.0 | 540/400 |
| Oil B | 4.5 | 530/330 |
| Oil B | 10.0 | 650/480 |

These test results clearly show that although the silicone polymer is an effective foam-inhibitor in the uncompounded oil it is practically ineffective as a foam inhibitor in the compounded oil, even when employed in relatively large amounts.

Portions of Oil B were then mixed with 1.5 p.p.m. of the same silicone polymer and to the mixture was added small amounts of the inhibitors of the invention and these compositions tested for foaming after storage. The results are shown in Table III.

*Table III*

| Inhibitor | Percent Inhibitor Added | Silicone Polymer [1] (p.p.m.) | FT/FS (cm.³) | | | |
|---|---|---|---|---|---|---|
| | | | After 3 Days | After 14 Days | After 31 Days | After 83 Days |
| Oil B | None | 1.5 | 660/610 | 670/620 | 670/620 | 670/620 |
| Oleic Acid plus 5 EO | 0.05 | 1.5 | 25/0 | 5/0 | 0/0 | 20/0 |
| Oleic Acid plus 10 EO | 0.05 | 1.5 | 20/0 | 0/0 | 10/0 | 30/0 |
| Stearic Acid plus 5 EO | 0.05 | 1.5 | 160/5 | 30/0 | 70/0 | 100/0 |
| Stearic Acid plus 10 EO | 0.05 | 1.5 | 15/0 | 0/0 | 0/0 | 10/0 |
| Stearic Acid plus 15 EO | 0.05 | 1.5 | 30/0 | 0/0 | 70/0 | 80/0 |
| Mixture of 70% Rosin [2] +30% C₁₆-C₁₈ Unsaturated Fatty Acids plus 15 EO | 0.03 | 1.5 | 140/10 | 20/0 | 10/0 | 30/0 |

[1] Dow-Corning Fluid 200, 60,000 cs. at 25° C.
[2] Approximately 90% Abietic Acid.

It will be apparent from the foregoing examples and tests that the inhibitors of the present invention act to prevent any substantial foaming and that such foam as may be formed initially is merely transient and disappears substantially completely before expiration of the 10-minute standing period called for by the standard test. It is considered especially significant that these inhibitors continue to act as foam inhibitors even after as much as 83 days. A further feature of this invention lies in the fact that the inhibitors are effective with even very small amounts of the silicone.

From the standpoint of economy it is, of course, desirable that the amount of inhibitor as well as the amount of silicone polymer added to the oil composition be kept to a minimum. It has been found that as little as 1–2 parts per million of silicone is effective with as little as 0.01% of inhibitor. The amounts of silicone and inhibitor used, however, will depend on the nature and/or amount of the detergent additives present in the oil composition. Generally, the detergent additives are employed in various oil compositions in amounts ranging from about 0.5% to about 30%, usually from 1% to about 5%. As a rule, the amount of silicone polymer will be between about 0.5 and about 10.0 parts per million, while the amount of inhibitor used will be between 0.01% and 1.0%, and preferably between about 0.03% and about 0.3%. Obviously, amounts of silicone and/or inhibitor substantially greater than these relatively small amounts can be employed without lessening of the anti-foaming benefits of the invention. Accordingly, it will be understood that the use of such higher amounts is within the spirit and scope of the invention.

It is pointed out that all of the percentage amounts stated hereinabove and in the appended claims are on a weight basis.

Although the invention has been described herein in terms of specific embodiments and examples thereof, it is not intended that the scope thereof be limited in any way thereby, but only as indicated in the following claims.

What is claimed is:

1. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25°C. of from about 3.0 cs. to about 1,000,000 cs. and (b) a minor amount, from about 0.01% to about 1.0%, of an alkoxylated aliphatic acid of the formula:

$$RCOO(R'O)_xH$$

wherein R is an aliphatic radical of from about 12 to about 18 carbon atoms, R'O is a radical selected from the group consisting of ethylene oxide and propylene oxide radicals and x is an integer having an average value of from 1 to about 25.

2. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1.0%, of an ethoxylated stearic acid containing an average of from about 5 to 15 ethylene oxide groups per mole of acid.

3. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1.0% of an ethoxylated oleic acid containing an average of from about 5 to 15 ethylene oxide groups per mole of acid.

4. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1.0% of an ethoxylated mixture of fatty acids derived from coconut oils containing an average of from about 5 to 15 ethylene oxide groups per mole of acid.

5. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1.0% of an ethoxylated mixture of acids comprised of about 70% rosin and about 30% $C_{16}$–$C_{18}$ unsaturated fatty acids containing an average of from about 5 to 15 ethylene oxide groups per mole of acid.

References Cited by the Examiner

UNITED STATES PATENTS

| | | | |
|---|---|---|---|
| 2,085,709 | 6/1937 | Steibert | 252—9.23 |
| 2,829,112 | 4/1958 | Solomon | 252—358 |
| 2,843,551 | 7/1958 | Leonard et al. | 252—321 |
| 2,906,712 | 9/1959 | Edwards et al. | 252—321 X |
| 2,972,579 | 2/1961 | Delfel | 252—358 X |

OTHER REFERENCES

Ross: "Chemical Antifoaming Agents," Chemical Industries, May 1949, p. 757–759.

DANIEL E. WYMAN, *Primary Examiner.*

JULIUS GREENWALD, *Examiner.*